Nov. 2, 1926. H. M. PFLAGER Re. 16,455

LOCOMOTIVE TRAILER TRUCK

2 Sheets-Sheet 1

Original Filed Sept. 14, 1925

INVENTOR:
HARRY M. PFLAGER.

BY Carmichael, Bedell & Janus
ATTORNEYS.

Nov. 2, 1926. H. M. PFLAGER Re. 16,455

LOCOMOTIVE TRAILER TRUCK

2 Sheets-Sheet 2

Original Filed Sept. 14, 1925

INVENTOR:
HARRY M. PFLAGER.
By Cornwall, Bedell & Jones
ATTORNEYS.

Reissued Nov. 2, 1926. Re. 16,455

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

LOCOMOTIVE TRAILER TRUCK.

Original No. 1,593,466, dated July 20, 1926, Serial No. 56,216, filed September 14, 1925. Application for reissue filed September 22, 1926. Serial No. 137,156.

My invention relates to railway rolling stock and consists in an improved trailer truck construction for use in locomotives.

The object of my invention is to provide a trailer truck frame and ash pan structure so united with each other that the one forms a part of and reinforces the other, thereby eliminating a number of duplicate parts or other necessary reinforcements of the truck frame and ash pan elements.

In Patent No. 1,593,465, copending with the original patent upon which this reissue application is based, I illustrate a similar invention embodied in a trailer truck in which the wheel pieces are located on the outside of the wheels. In my present invention, the preferred structure embodies the application of my invention to a truck in which the wheel pieces are located inside of the wheels, and in the accompanying drawings illustrating my invention—

Figure 1:
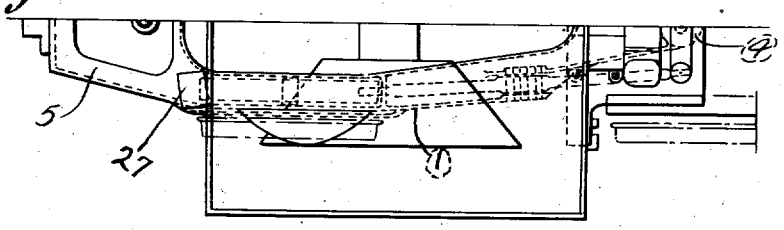
Figure 1 is a longitudinal one-half top view of a two wheel trailer truck embodying my invention.
Figure 2:
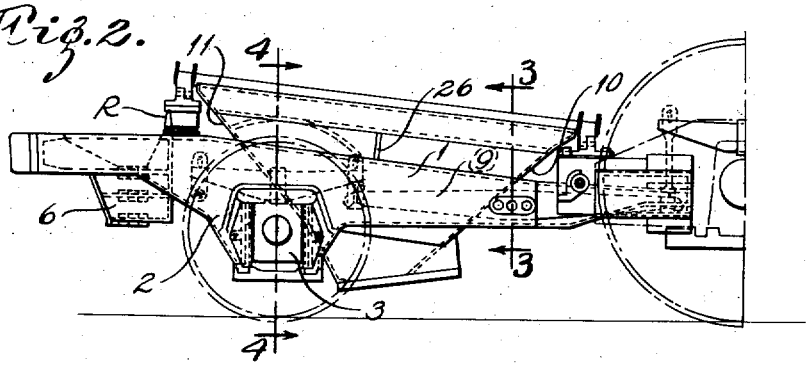
Figure 2 is a side elevation of the same.
Figure 3:
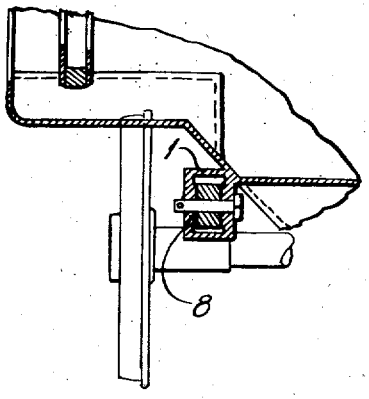
Figure 4:
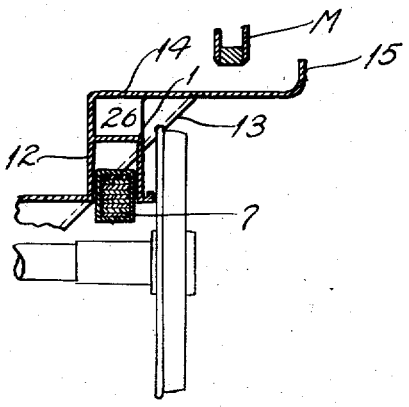

Figures 3 and 4 are vertical transverse sections on lines 3—3 and 4—4, respectively, of Figure 2.

Figure 5:
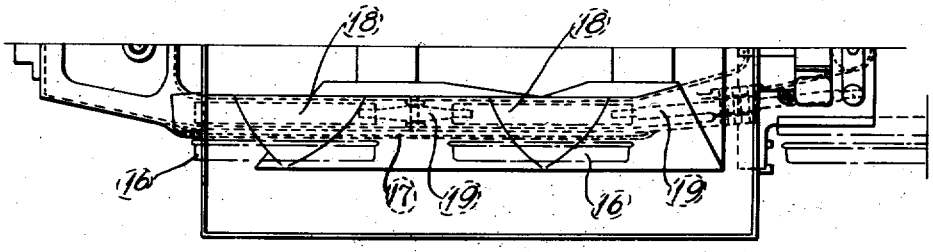

Figure 5 is a longitudinal one-half view of a modified embodiment of my invention showing the same applied to a four wheel trailer truck.

Figure 6:
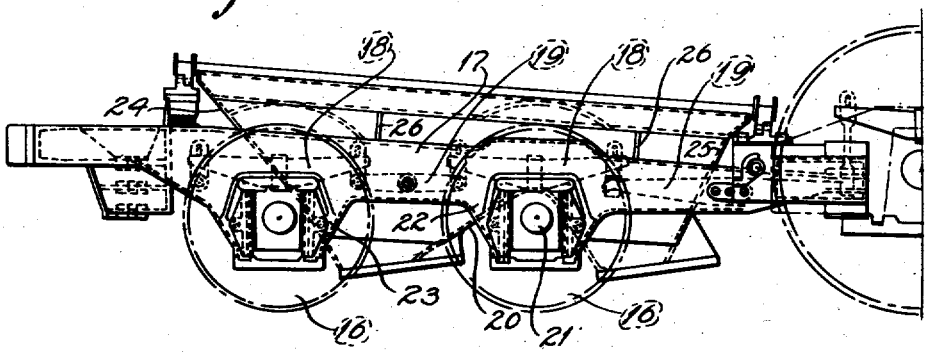

Figure 6 is a side elevation of the same.

In the preferred embodiment of my invention, the truck frame comprises a one-piece casting having wheel pieces 1 with integral pedestals 2 mounted upon the truck journal box 3 in the usual manner, the forward ends of the wheel pieces converging to form a center plate 4 by which the truck is attached to the locomotive frame. The rear ends of the wheel pieces are united by a cross member 5 which preferably forms a foot plate and includes a drawbar pocket or pockets 6 and supports 27 for the firebox rocker bearings R.

The wheel pieces are box-shaped in cross section except over the journal boxes where the lower wall is removed to accommodate the truck springs 7. Equalizer fulcrum bearings 8 are formed on the side walls of the wheel pieces and the latter serve as housings for the truck springs and for equalizers 9 which connect the truck spring system with the locomotive spring system, the end of which is indicated at the righthand of Figure 2. Transverse elements 10 and 11 from respectively the front and rear walls of the ash pan, the side walls of which are fromed in part by the inner walls 12 of the wheel pieces 1 and in part by the inclined portions 13 which extend over the tops of the wheel pieces where the latter occupy a lower level than over the journal boxes. The inner wall 12 of the wheel piece forming the side of the ash pan extends a substantial distance above the top of the wheel piece and then outwardly horizontally as indicated at 14, terminating in a vertical shoulder 15 extending upwardly to the level of the locomotive mud ring M.

In the one-piece structure shown, not only is the duplication or addition of necessary frame cross members and other strengthening parts eliminated, but I also eliminate the bolts or rivets and the labor necessary for machining, fitting, and assembling separate ash pan and truck frame structures with each other.

In the modification illustrated in Figures 5 and 6 I show my invention as applied to a four wheel trailer truck with the wheels 16 located on the outside of the wheel pieces 17 and with the latter serving as hollow housings for the springs 18 and equalizers 19. In this structure an ash pan bottom wall 20 extends over the axle 21 and serves to brace the pedestal portions 22 corresponding to the bracing of pedestal portion 23 by the ash pan rear wall 24. Obviously the forward ends of the wheel pieces are braced by the ash pan front wall 25.

In both forms of my invention as illustrated in the accompanying drawings, the horizontal shelf portion of the ash pan is braced from the wheel piece by suitable ribs 26. Obviously various modifications in the details of my invention may be made without departing from the spirit thereof and I contemplate the exclusive use of all such modifications as fall within the scope of my appended claims.

I claim:

1. In a trailer truck, wheels, wheel pieces inside of said wheels, and an ash pan formed integrally with said wheel pieces and extending outwardly over said wheels.

2. In a trailer truck, wheels, wheel pieces inside of said wheels, and an ash pan formed integrally with said wheel pieces and extending outwardly from the top of said wheel pieces and inwardly from the bottom of said wheel pieces.

3. A two-wheel trailer truck comprising wheel pieces and an ash pan formed integrally.

4. A two-wheel trailer truck comprising wheel pieces, an ash pan formed integrally therewith, said wheel pieces being connected in the front and rear of said ash pan to form respectively a pivotal bearing connection to a locomotive frame and a draft or buffing member.

5. A two-wheel trailer truck frame including an integral ash pan, and draft elements on said frame at each end of said ash pan.

6. A two-wheel trailer truck frame including wheel pieces connected to each other at each end and connected to each other intermediate their ends by transverse walls of an ash pan, and draft elements carried by said frame.

7. In a trailer truck frame, wheel pieces forming ash pan side walls.

8. In a trailer truck frame, wheel pieces forming ash pan side walls, and a member connecting the lower portions of said wheel pieces to form an ash pan end or bottom wall.

9. In a trailer truck frame, hollow wheel pieces forming spring housings and ash pan side walls, and horizontal and inclined members connecting said wheel pieces and forming transverse frame elements and bottom and end walls for the ash pan.

10. In a trailer truck frame, a hollow wheel piece, the inner wall of which extends upwardly between the top of the wheel piece and then outwardly beyond the outer wall of the wheel piece, thereby forming a side wall and an extension shelf of an ash pan.

11. A two wheel trailer truck frame including wheel supported portions intermediate its ends, wheel pieces extending forwardly from said portions and converging to form a center bearing for pivotal connection to a locomotive frame, and an ash pan formed integrally with said wheel pieces and disposed substantially over and in front of said wheel supported portions.

12. In a two wheel truck frame, wheel pieces, pedestals, and an ash pan formed integrally.

13. In a two wheel truck frame, wheel pieces, draft members at the ends of said wheel pieces, and an ash pan located between said wheel pieces and draft members and formed integrally therewith.

14. In a two wheel truck frame, wheel pieces, depending pedestals, and an ash pan end wall extending between said wheel pieces abreast of their pedestal forming portions and formed integrally therewith.

In testimony whereof I hereunto affix my signature, this 9th day of Sept., 1926.

H. M. PFLAGER.